United States Patent
Gross et al.

(10) Patent No.: US 10,908,043 B2
(45) Date of Patent: Feb. 2, 2021

(54) DRAFT RANGE TRANSMITTER ENCLOSURE

(71) Applicant: O'Brien Holding Co., Inc., St. Louis, MO (US)

(72) Inventors: Warren J. Gross, Defiance, MO (US); Eduardo G. Miranda, Houston, TX (US)

(73) Assignee: OBCORP LLC, St. Louis, MO (US)

( * ) Notice: Subject to any disclaimer, the term of this patent is extended or adjusted under 35 U.S.C. 154(b) by 585 days.

(21) Appl. No.: 15/725,053

(22) Filed: Oct. 4, 2017

(65) Prior Publication Data

US 2018/0100778 A1    Apr. 12, 2018

Related U.S. Application Data (60) Provisional application No. 62/407,305, filed on Oct. 12, 2016.

(51) Int. Cl.
| | |
|---|---|
| *G01L 19/04* | (2006.01) |
| *G01L 19/06* | (2006.01) |
| *G01L 19/00* | (2006.01) |
| *G01L 19/14* | (2006.01) |
| *G01L 13/00* | (2006.01) |

(52) U.S. Cl.
CPC .......... *G01L 19/0627* (2013.01); *G01L 13/00* (2013.01); *G01L 19/0007* (2013.01); *G01L 19/04* (2013.01); *G01L 19/0609* (2013.01); *G01L 19/142* (2013.01)

(58) Field of Classification Search
CPC .................................................. G01L 19/0627
USPC ............................................................ 73/431
See application file for complete search history.

(56) References Cited

U.S. PATENT DOCUMENTS

| | | | | |
|---|---|---|---|---|
| 5,269,076 | A | * | 12/1993 | Breckenridge ......... F26B 21/02 34/191 |
| 5,878,741 | A | | 3/1999 | Dempsey et al. |
| 6,053,162 | A | | 4/2000 | Godfree et al. |
| 6,109,255 | A | | 8/2000 | Dieckmann et al. |
| 6,647,783 | B2 | * | 11/2003 | Wewers ................ G01N 1/2273 422/98 |
| 8,544,334 | B2 | | 10/2013 | Jo |
| 9,291,355 | B2 | | 3/2016 | Hugghins |
| 10,161,822 | B1 | * | 12/2018 | Rollins ................. G01L 13/025 |

OTHER PUBLICATIONS

O'Brien; AMETEK, Complete Freeze Protection for Process Instrumentation, QLT-VPBR-01 Brochure, May 15, 2015, 28 pages.

(Continued)

*Primary Examiner* — Walter L Lindsay, Jr.
*Assistant Examiner* — Philipmarcus T Fadul
(74) *Attorney, Agent, or Firm* — Sandberg Phoenix and von Goulard (57) ABSTRACT

A method and structure which provide an ambient pressure measurement that is unaffected by wind and localized environmental conditions. A draft range pressure transmitter is enclosed inside an enclosure which is resistant to wind and other transient localize environmental conditions. A vent cap allows slow air movement through a wall of the enclosure and forms a still air chamber for the transmitter. The pressure inside the enclosure changes at the same rate as the barometric pressure but is unaffected by wind or wind gusts.

20 Claims, 13 Drawing Sheets

(56) References Cited

OTHER PUBLICATIONS

O'Brien, Vipak Versatile Instrument Package Featuring Trakmount, QLT-GRPTRAK Brochure, Feb. 1, 2004, 2 pages.
Stego, Vent Plug DA 284, 1 page.
Siemens, Siemens Energy & Automation, Application Data Sheet ADSITRPDS3-1, Rev 1, May 2005, 8 pages.
Coulton, Beginner's Guide to Differential Pressure Transmitter, http://www.coulton.com/beginners_guide_to_differential_pressure_transmitters.html, Printed Sep. 30, 2016, 6 pages.
Preferred Utilities Mfg Corp, Draft Range Transmitter Assembly Model JC-22XMTR, catalog page, 1 page.
Rosemount, Rosemount 3051 Pressure Transmitter, 3051 Reference Manual 00809-0100-4051,Rev AA, Jan. 2007, 2 pages.

\* cited by examiner

DRAFT RANGE TRANSMITTER ENCLOSURE

CROSS-REFERENCE TO RELATED APPLICATIONS

This United States non-provisional application claims priority to U.S. Provisional Application 62/407,305, filed Oct. 12, 2016, which is hereby incorporated by reference, along with its appendices.

STATEMENT REGARDING FEDERALLY SPONSORED RESEARCH

Not applicable.

BACKGROUND OF THE INVENTION

The present invention relates to differential pressure sensors having one leg attached to ambient atmospheric pressure and a second leg ("impulse line") attached to a source. In a common use, the source is a combustion chamber, its air inlet, or its exhaust. The pressure difference in such uses is often very small. The term "draft range" transmitter generally refers to a combined differential pressure sensor and data transmitter which measures pressures less than 5.0" H2O. Such devices and their problems are discussed, for example, in Siemens Energy & Automation, Application Data sheet ADSITRPDS3-1, Rev 1, May 2005, and in Coulton.com "Beginner's guide to Differential Pressure Transmitters," both of which are hereby incorporated by reference. The output of the draft range transmitter is used to control air flow in the burner, and to trigger alarms and shutoffs when the pressure difference becomes too great or too small. Especially when the transmitter is placed outdoors, slight changes in temperature or ambient atmospheric pressure across the atmospheric inlet can create false swings in the measured differential. Such changes may be caused by air flow from any source. Common sources include wind gusts or passing traffic.

Pressure measurement in furnace and boiler combustion is critical for safety, efficiency, and environmental control. The pressure is extremely low, often in the range of −1.0 to +2.0" H2O, and installation problems that would normally be inconsequential can wreak havoc with draft range systems.

Using a differential pressure transmitter, the reference measurement is vented to atmosphere where air flowing past the open port creates pressure changes and false measurement of atmospheric pressure resulting in errors of furnace, heater, and boiler combustion box differential pressure. These pressure changes can be caused, for example, by a venturi effect due to wind passing across the open port or by a direct pressure change due to wind blowing into the open port. As part of the Safety Instrumented System, these measurement errors can create nuisance maintenance and shutdowns affecting the entire unit.

These problems are largely independent of the type of differential pressure sensor, whether a traditional dual diaphragm system or an electronic sensor system.

Prior attempts to solve these problems are discussed, for example, in the previously-mentioned Siemens Application Data sheet, in Preferred Mfg., Catalog 25, and in Rosemount 3051 Pressure Transmitter 3051 Reference Manual 00809-0100-4051, Rev. AA, January 2007, page 2-3, and in such patents as U.S. Pat. No. 8,544,334, to Jo, assigned to Yokogawa Corporation of America. None of these solutions has been universally successful.

SUMMARY OF THE INVENTION

The present invention provides a simple and effective way to reduce or eliminate false readings of a differential pressure transmitter vented to ambient. In an embodiment, the transmitter is placed inside an enclosure which is wind resistant. A vent mechanism allows slow air movement through a wall of the enclosure. The enclosure atmospherically equalizes the still air chamber for the transmitter The pressure inside the enclosure changes at the same rate as the barometric pressure but is unaffected by wind or wind gusts.

Preferably the vent mechanism is a vent cap. Vent caps typically include a hollow, externally threaded stem and an internally threaded cap. The cap in an embodiment has a peripheral inturned rim having a plurality of small openings interior of the rim, the openings communicating with the hollow stem. The stem of the vent cap is preferably mounted in a position that does not potentially block free exchange of pressure. At or near the bottom of a side wall of the enclosure is presently preferred, although the position of the vent mechanism is not believed to be critical. Placing the vent in a side wall of the enclosure, rather than through the bottom, simplifies mounting the enclosure to the top of a pole.

The vent also preferably includes a semipermeable membrane to slow or limit transfer of air through the vent. The term "semipermeable membrane" is used broadly herein to include not only polymeric films but solid structures such as polymeric, ceramic, and sintered metal disks and plugs which pass molecules and particles up to micron size.

The enclosure, both before and after the cap is installed, preferably meets at least ISO standard IP65 per EN 50014 and also meets NEMA 4. Meeting IP65 or NEMA 4 standards is not in all cases a requirement, but they meet the requirement that the enclosure itself be air-tight. The enclosure must provide isolation for the atmospheric pressure port of the differential pressure instrument, such that it is not affected by air moving across or at sealing gaskets/surfaces or penetrations. Additionally, there must be a structure and method of equalizing the air pressure inside the enclosure with the ambient atmospheric pressure. Pressure equalization must take place at the same rate of change as the ambient atmospheric pressure change.

In embodiments, the enclosure is made of a polymeric material, such as glass reinforced plastic (GRP) or a formed thermoplastic, such as polyethylene or Acrylonitrile Butadiene Styrene (ABS). A wind resistant enclosure made of other materials is also usable. In embodiments, the enclosure is formed as a two-piece clamshell with latches, and often with a hinge between the pieces. Such enclosures include gaskets around their parting lines, to ensure that when closed the enclosure forms a still air chamber. Ametek-O'Brien (St. Louis, Mo.) VIPAK® Series 500 and 700 GRP enclosures are suitable, as are O'Brien VIPAK® enclosures made of ABS.

In embodiments, the enclosure is also insulated. In some embodiments, the walls of the enclosure comprise a polymeric foam. In embodiments, the foam is 0.5" to 2.0" thick. In embodiments the foam is a polyurethane. The insulated enclosure system ensures that both sides of the instrument measurement capsule are at the same temperature. Because these instruments are often placed near the furnace, heater, or boiler, one side can be hotter than the other side, thereby creating an error in measurement. The thermal isolation provided by the enclosure performs two functions. It assures that the differential pressure instrument is at a uniform temperature and not subjected to localized uneven heating across its sensing element(s). Uneven heating of the differential pressure instrument may create a bias error in the measurement. It also slows the rate of temperature change caused by diurnal to nocturnal changes and temperature change created by weather changes.

Some specifications require a static air baffle mounted directly to the ambient sensing port of the transmitter; although not required for the benefits of the present invention, such a baffle or filter can be attached without affecting the operation of the transmitter.

For cold temperature installations or wet sample applications, enclosure heaters may be added, as may insulated or heat traced impulse tubing. A heat-shrink entry seal may be added for the impulse tubing. For use in CL I, Div 2 areas, special instrument power or signal connection cabling may be used.

Examples of enclosures which may be used in the present invention, by way of example, are shown in O'Brien-Ametek brochure APP-DRAFTTRANS-NP, 9 Sep. 2016.

All patents and literature mentioned herein are hereby incorporated by reference.

DESCRIPTION OF THE PREFERRED EMBODIMENTS

Referring now to the drawings, and in particular FIGS. 1-4, reference numeral 1 indicates an embodiment of a differential pressure transmitter enclosure of the present invention, housing a draft range transmitter 3.

The draft range transmitter 3 includes a sensor body or manifold 31 having a reference breather 33 communicating with ambient attached to one port and an impulse line 35 communicating with a burner attached to another port. In accordance with many specifications, a static air baffle 36 is mounted to the reference breather 33. This baffle 36 is not generally required for operation of the draft range transmitter 3 in accordance with the present invention, but does not interfere with the operation of the present invention. An O'Brien BDT6 or AMCSAPPSS static filter may be used if desired. An electronic transmitter 37 attached to the body 31 transmits information related to the difference in pressure between the reference breather tube 33 and the impulse tube 35. The information is utilized by a control and/or alarm for the burner. The transmitter 3 may be battery powered and wireless, or it may include power and signal wires.

The enclosure 1 includes a lower half 51 and a cover 53, held together by hinge 52. The halves 51 and 53 are made of ABS plastic, having a one-inch thick closed cell polyurethane foam interior liner bonded to it. Parting lines are protected by a molded flange and sealed with a closed cell neoprene gasket 58. The lower half and cover are held closed by latches 54. This is a standard C31 VIPAK® enclosure. The enclosure when closed is windproof and meets ISO standard IP65 per EN 50014 ("protected from total dust ingress; protected from low pressure water jets from any direction, limited ingress protection"). ISO IP standards "are used to define the levels of sealing effectiveness of electrical enclosures against intrusion from foreign bodies such as dirt and water." It may preferably also meet ISO IP66, protection from high pressure water jets. It also preferably meets NEMA (National Electrical Manufacturers Association) Standard 4X ("Enclosures constructed for either indoor or outdoor use to provide a degree of protection to personnel against access to hazardous parts; to provide a degree of protection of the equipment inside the enclosure against ingress of solid foreign objects (windblown dust); to provide a degree of protection with respect to harmful effects on the equipment due to the ingress of water (rain, sleet, snow, splashing water, and hose directed water); that provides an additional level of protection against corrosion; and that will be undamaged by the external formation of ice on the enclosure)". The enclosure is equipped with an O'Brien MK3 mounting kit, including a pipe adapter 55 for mounting the enclosure to a vertical outer mounting pipe 57, a lower plate 59, an upper plate 61, and an offset inner mounting pipe 63. A vertical mounting bracket 65 attached to a rear of the sensor body 31 is mounted to the inner pipe 63 by a U-bolt 67. It will be seen that if the height of the outer mounting height is reduced, the draft range transmitter 3 can be mounted at the same height, using the same mounting hardware, as it would have been absent the enclosure 1.

The enclosure 3 also includes a standard VIPAK® parting plate 68, drilled to accept the impulse tube 35.

Figure 13:
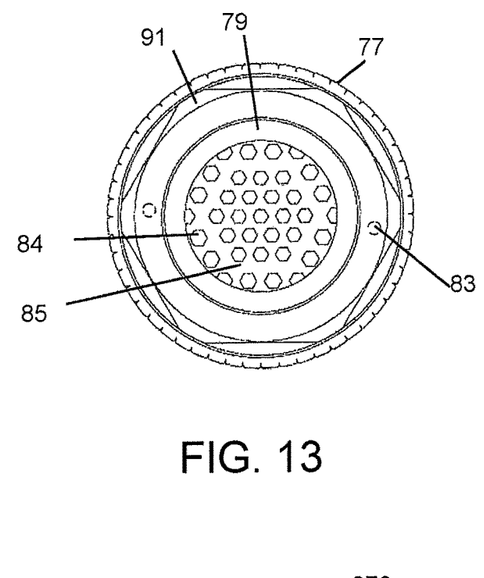
FIG. 13 is a bottom plan view of a breather cap portion of the enclosure of FIGS. 1-12.
Figure 14:
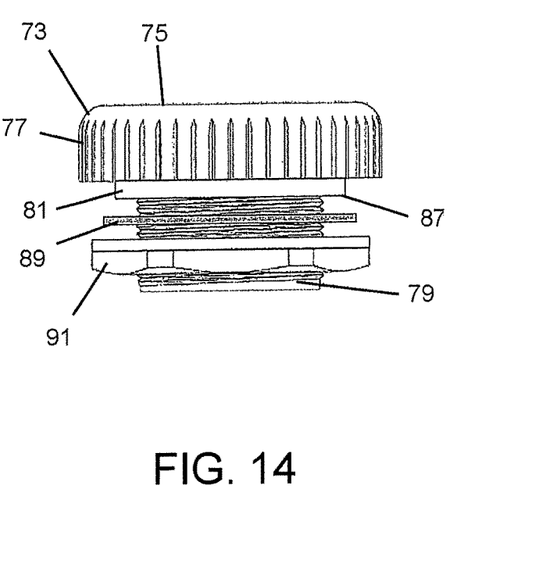
FIG. 14 is a view in side elevation of the cap of FIG. 13.

Mounted through a lower rear corner of a side wall 69 of the enclosure 3 is a breather cap 71. The breather cap 71, as shown in FIGS. 13-14, includes a cap portion 73 having an upper wall 75, a downwardly extending rim flange 77, and an externally threaded hollow stem 79. Between the rim flange 77 and the stem 79, is an inner wall 81, spaced from the upper wall 75. The inner wall 81 includes eight apertures 83 which communicate with the interior of the stem 79 through a gap between the upper wall 75 and inner wall 81, a semipermeable membrane 84, and an integral screen 85. The apertures 83 are illustratively about 0.05" to about 0.2"

in diameter, preferably about 0.125" in diameter. The semipermeable membrane 84 allows air and humidity to leave the enclosure. In the opposite direction, it only allows dry air into the enclosure while humidity and dust from the outside are blocked by the membrane.

At an upper end of the stem 79 is a shoulder 87 which seats a gasket 89. The shoulder 87 is spaced from the rim flange 77 by about 0.125" to assure that the rim flange 77 is spaced from the enclosure wall 69. The breather cap 71 is held to the wall 69 by a nut 91.

The breather cap 71 is illustratively a Stego, Inc., DA284 M40 vent plug.

Figure 1:
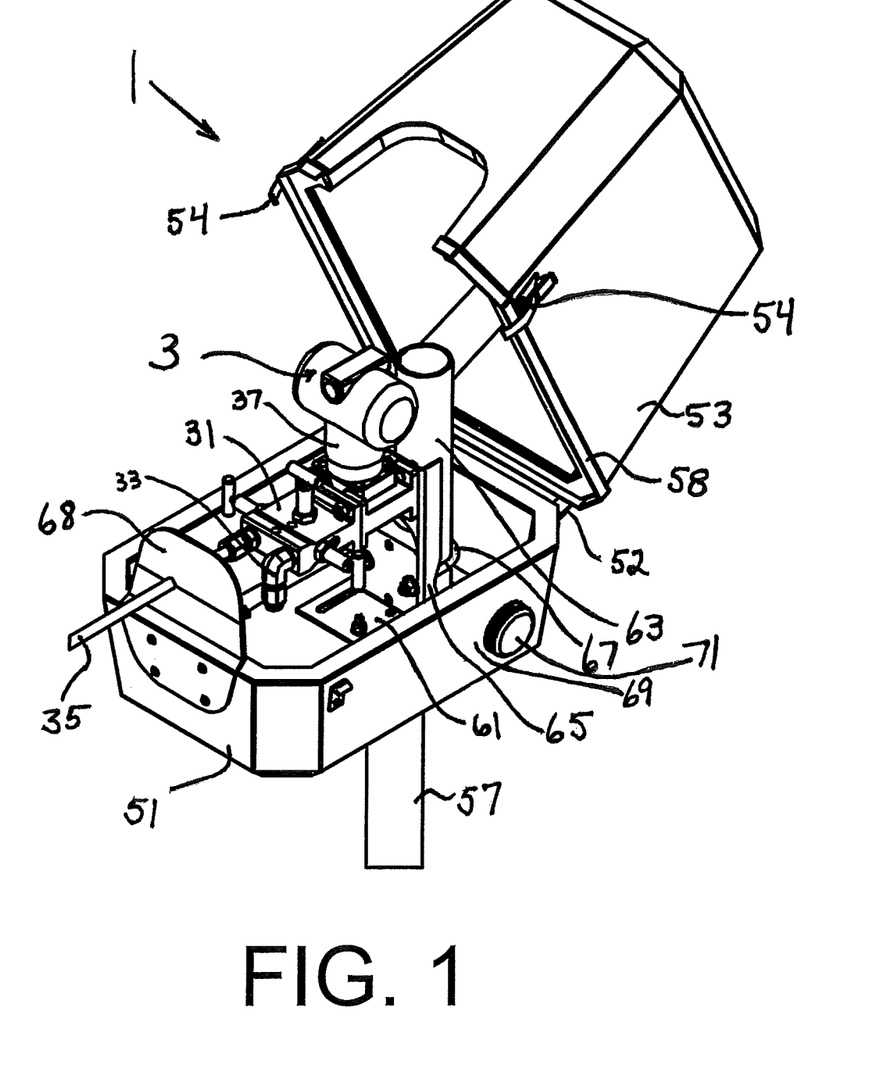
FIG. 1 is a view in perspective of a draft range transmitter in an enclosure in accordance with one embodiment of the present invention.
Figure 2:
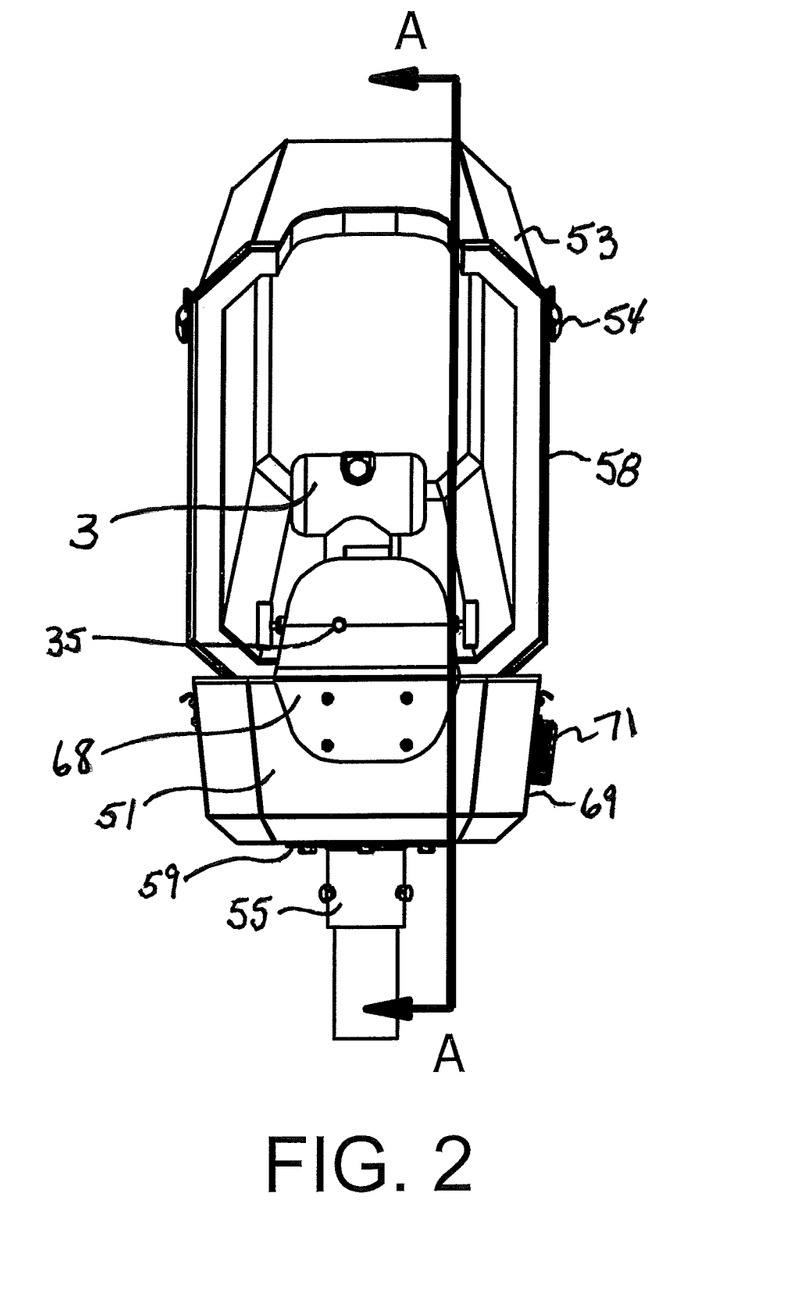
FIG. 2 is a view in front elevation of the transmitter and enclosure of FIG. 1.
Figure 3:
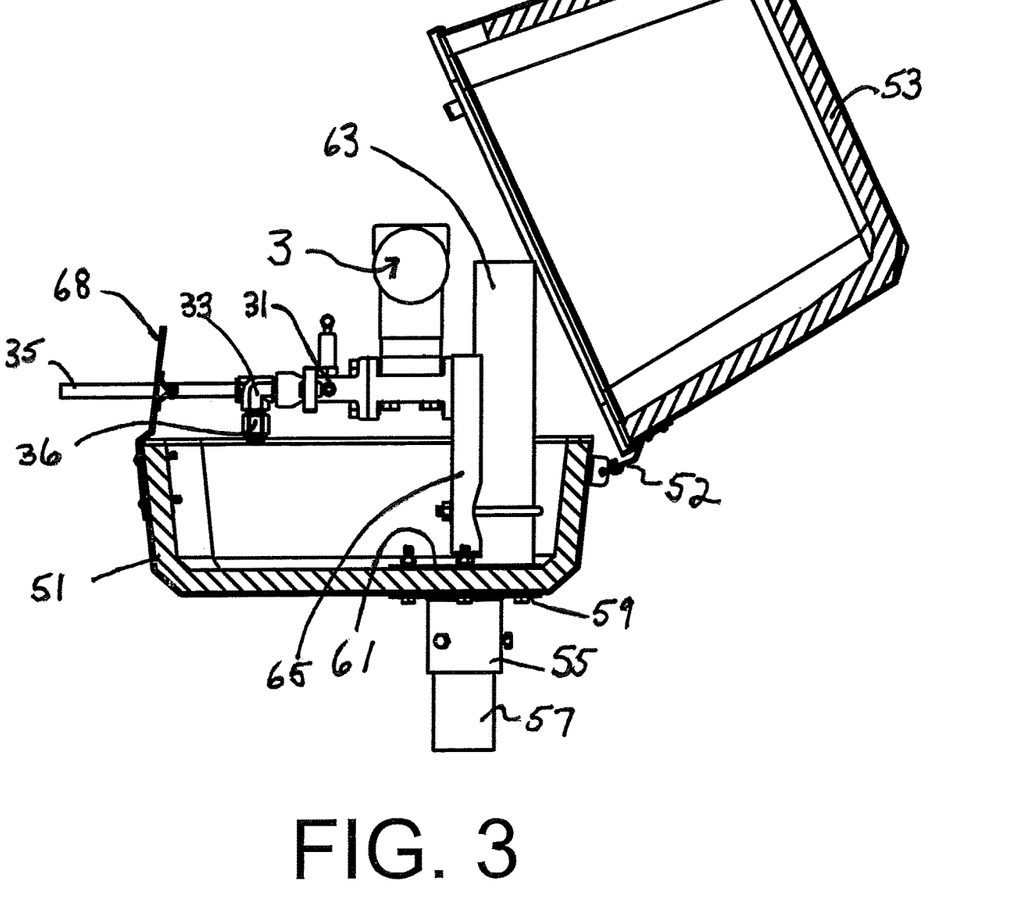
FIG. 3 is a sectional view, taken along line A-A of FIG. 2, of the transmitter and enclosure of FIGS. 1 and 2.
Figure 4:
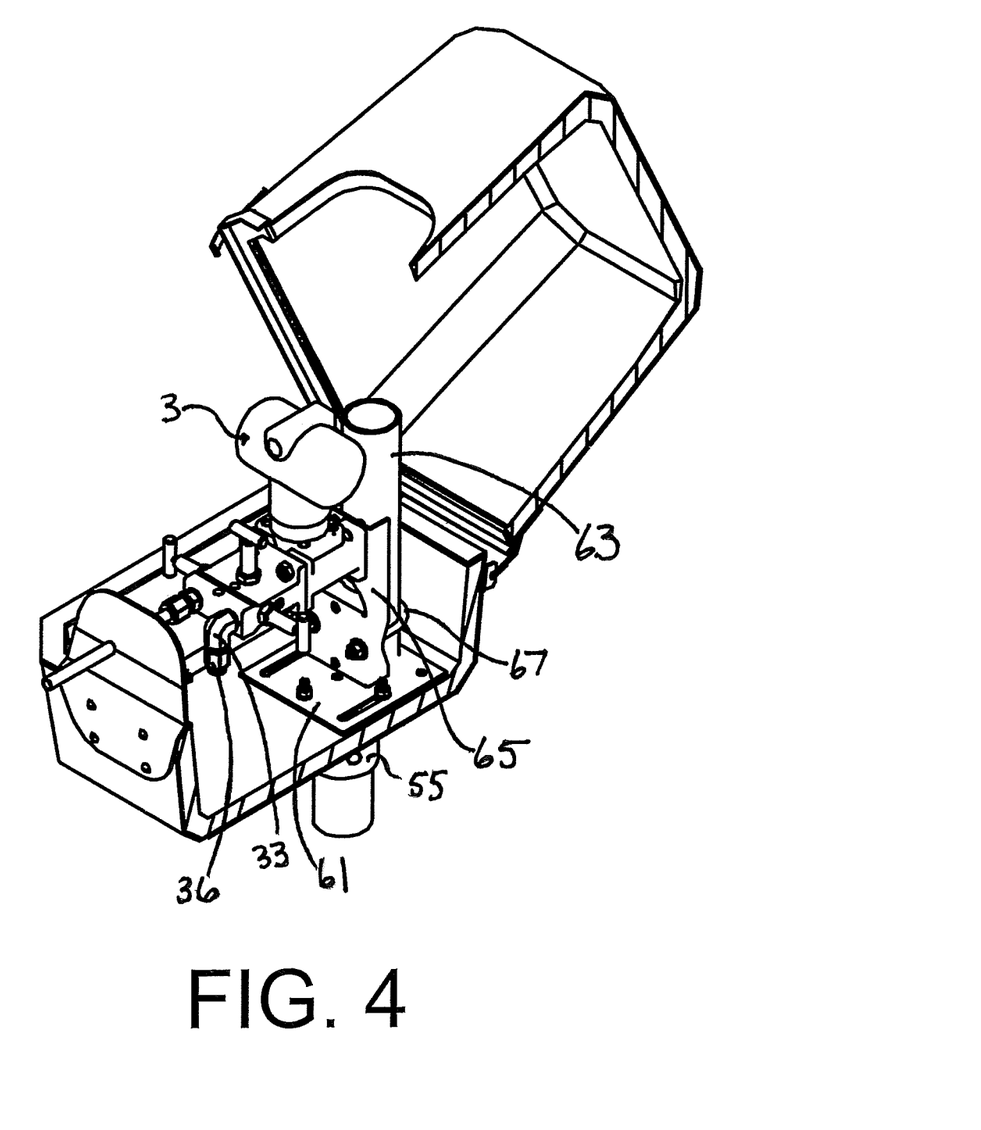
FIG. 4 is a view in perspective, corresponding to FIG. 1, taken along line A-A of FIG. 1.
Figure 5:
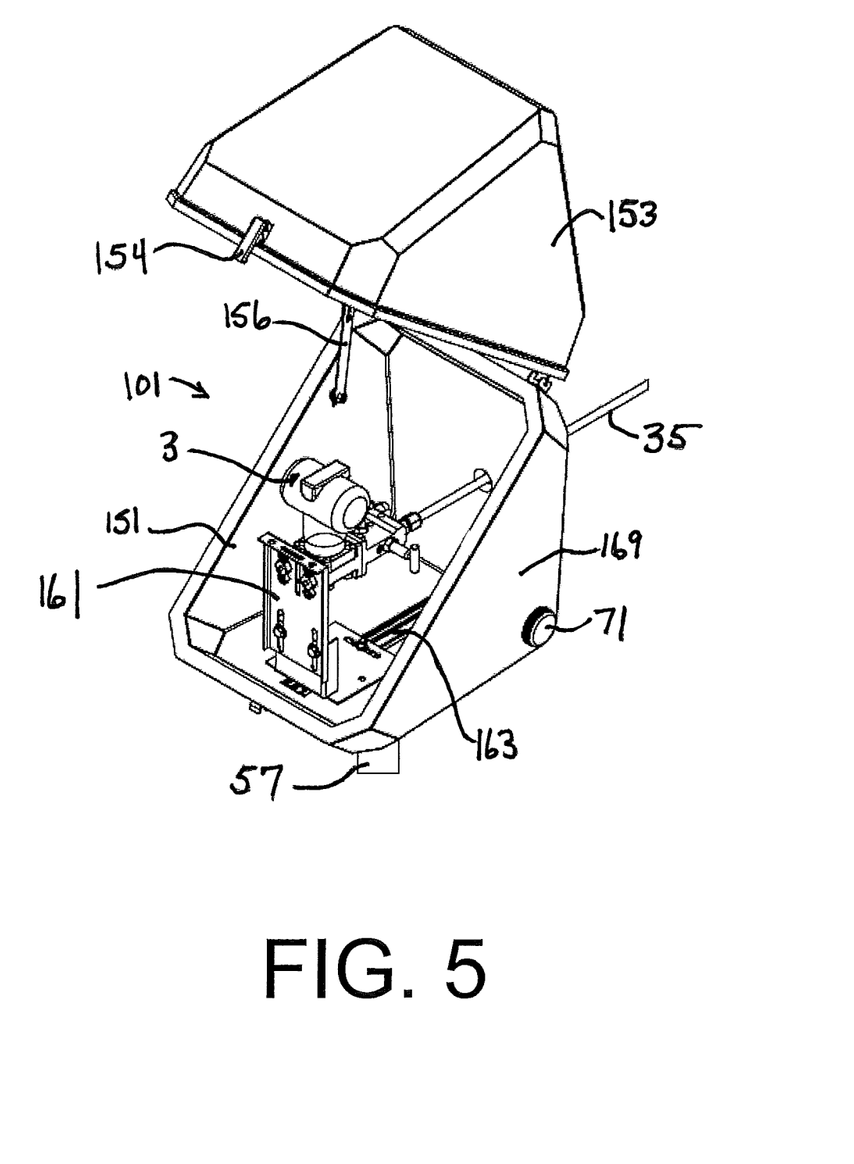
FIG. 5 is a view in perspective of a draft range transmitter in an enclosure in accordance with another embodiment of the present invention.
Figure 6:
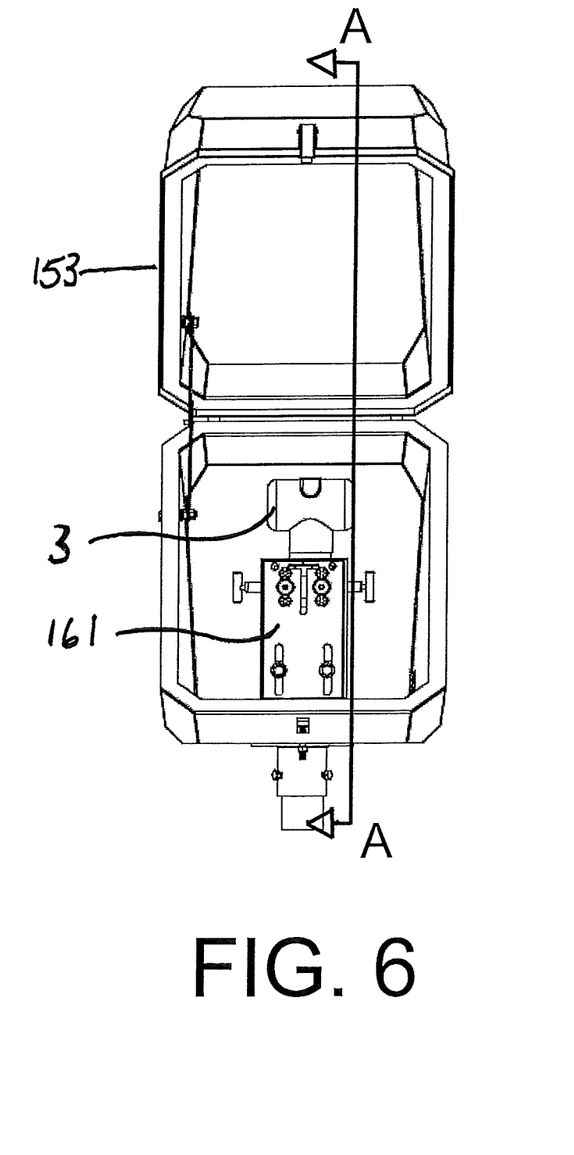
FIG. 6 is a view in front elevation of the transmitter and enclosure of FIG. 5.
Figure 7:
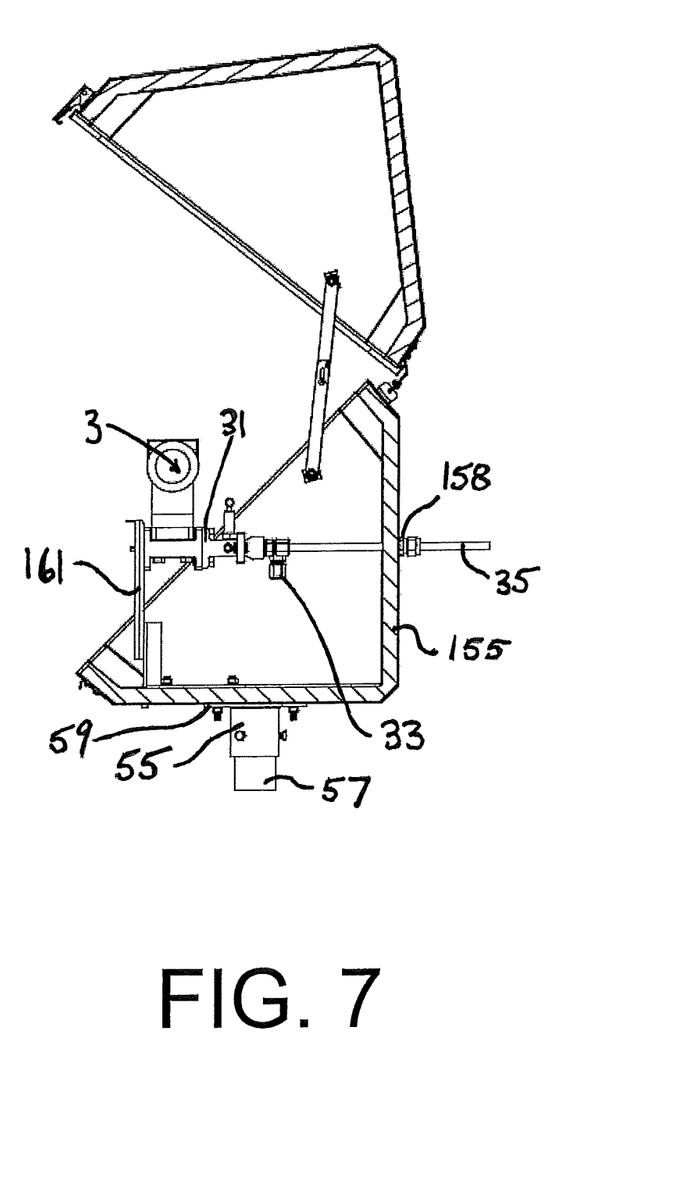
FIG. 7 is a sectional view, taken along line A-A of FIG. 6, of the transmitter and enclosure of FIGS. 5 and 6.
Figure 8:
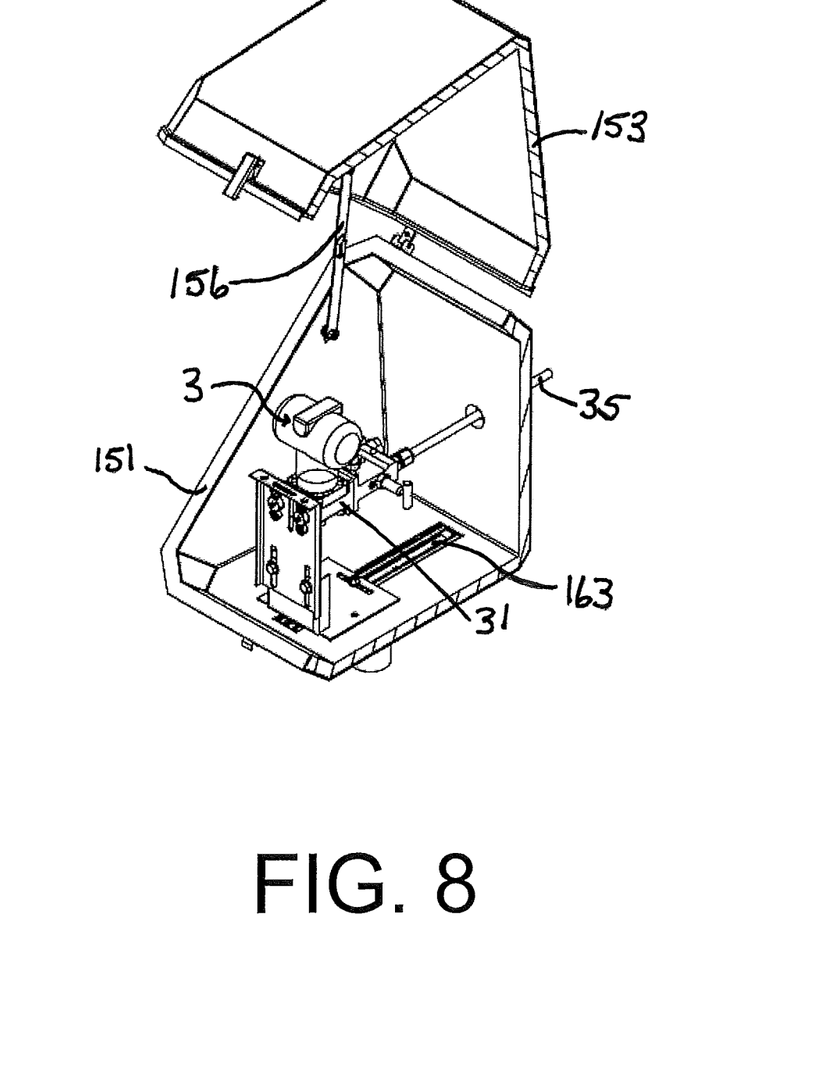
FIG. 8 is a view in perspective, corresponding to FIG. 5, taken along line A-A of FIG. 6.
Figure 9:
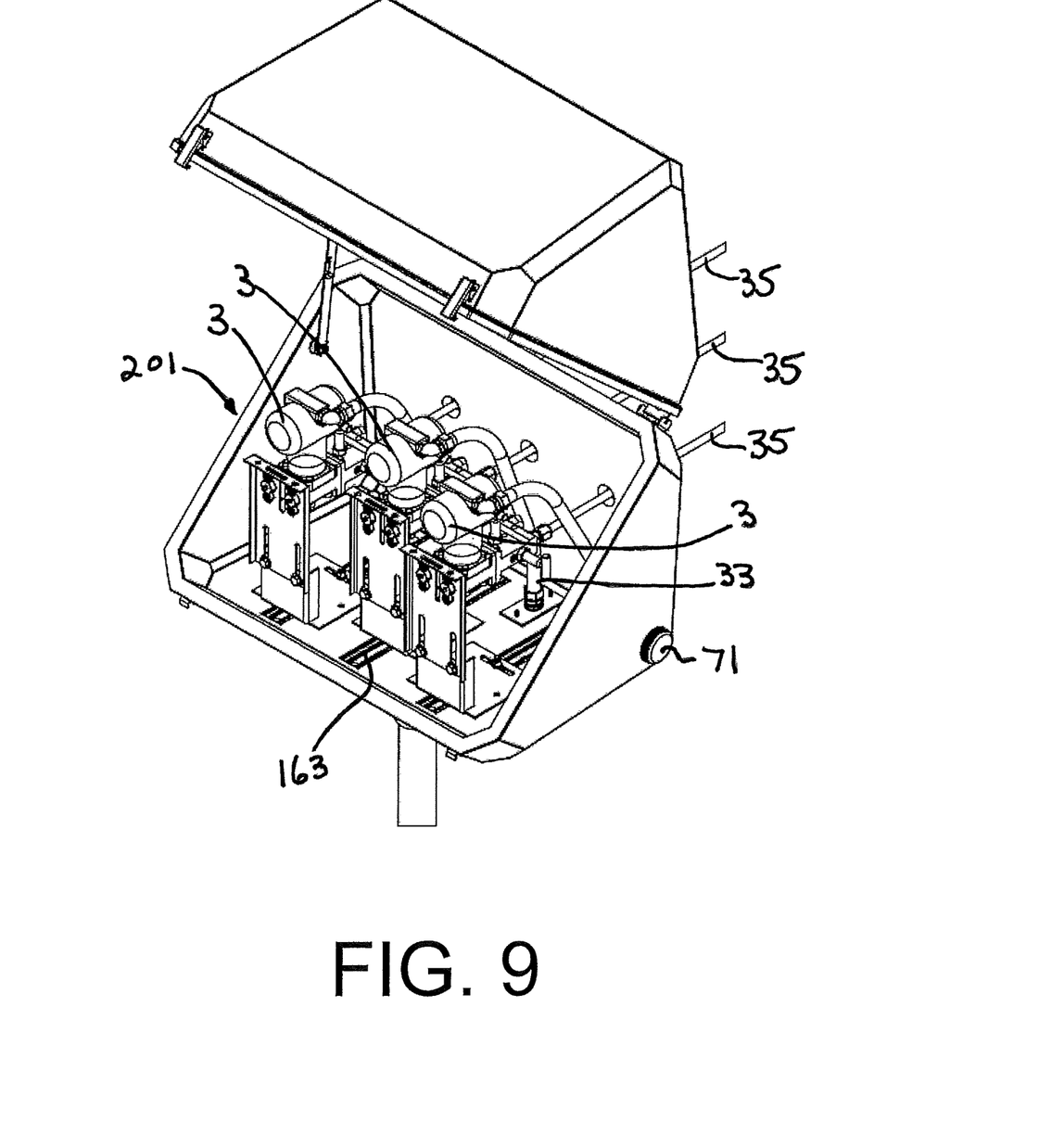
FIG. 9 is a view in perspective of a draft range transmitter in an enclosure in accordance with a third embodiment of the present invention.
Figure 10:
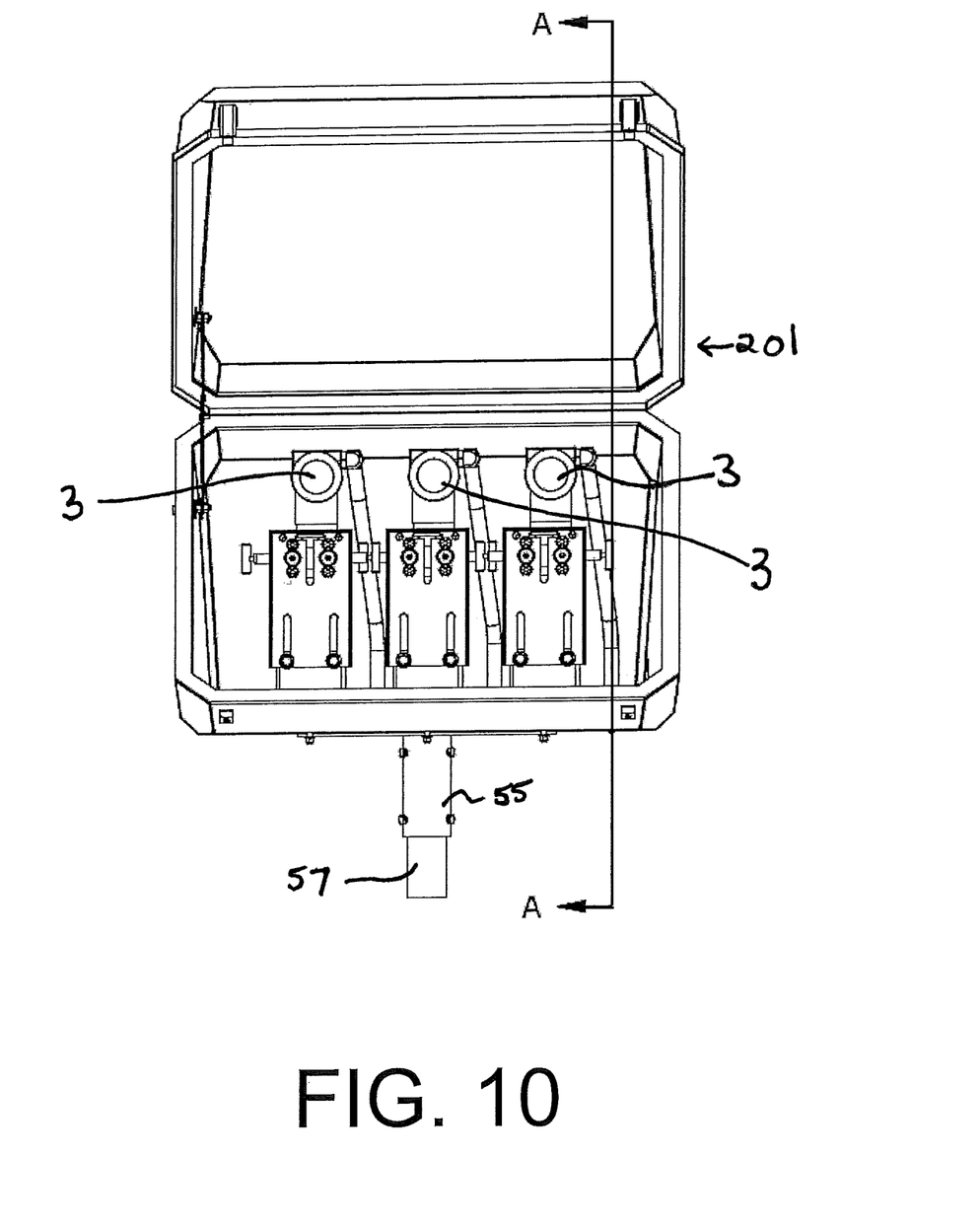
FIG. 10 is a view in front elevation of the transmitter and enclosure of FIG. 9.
Figure 11:
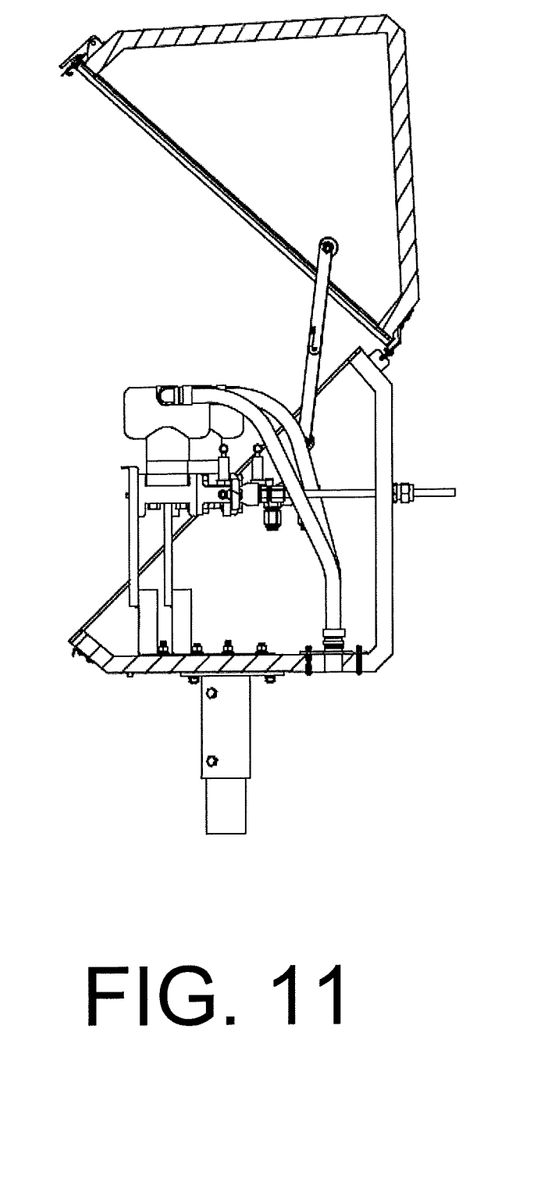
FIG. 11 is a sectional view, taken along line A-A of FIG. 10, of the transmitter and enclosure of FIGS. 9 and 10.
Figure 12:
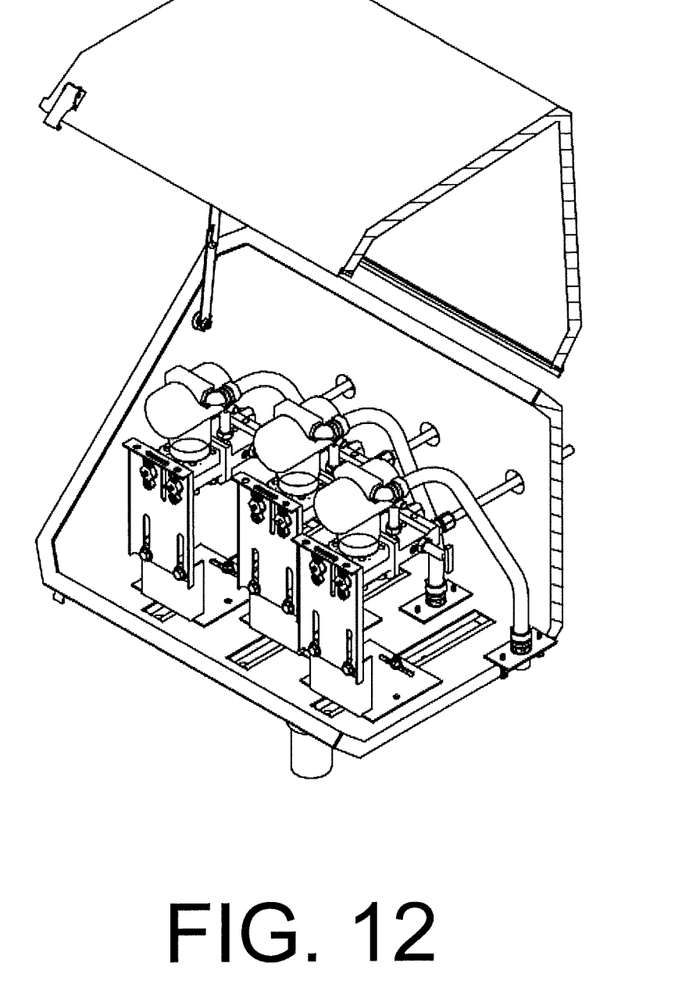
FIG. 12 is a view in perspective, corresponding to FIG. 9, taken along line A-A of FIG. 10.

Testing of the enclosure 1 has been carried out in severe weather conditions, and it has been found to eliminate the false alarms and shut-offs which had plagued the facility before its draft range transmitter was enclosed in the enclosure 1. The enclosure 1 has also been tested with high speed blowers to prove that sensed pressure differences are not affected by wind gusts up to 80 to 90 miles per hour. The enclosure thus continues to meet ISO IP65 and NEMA 4X. It is also believed to meet ISO IP66.

Numerous variations in the draft range transmitter enclosure of the present invention will occur to those skilled in the art in light of the foregoing disclosure.

Merely by way of example, other optional internal static air baffles may be provided on the breather tube; electric heaters may be provided, as can heat-traced and insulated impulse lines; and instrument power/signal lines may be provided for carrying electrical power and signals through the enclosure wall or parting plate without permitting wind, dust, or low pressure water jets to penetrate the enclosure.

As shown in FIGS. 5-8, a different type of enclosure 101 may be utilized. The enclosure 101 is an O'Brien A Style enclosure having a Trakmount™ recessed track mounting system. The enclosure includes a lower housing 151 and a cover 153. As with the enclosure 1, parting lines are protected by a molded flange and sealed with a closed cell neoprene gasket. Latches 154 and a support 156 are also provided. This is a standard A1T VIPAK® enclosure. The enclosure when closed is windproof and meets ISO standard IP65 and also meets NEMA Standard 4X. A universal mounting bracket 161 is slidably mounted in track 163. The bracket 161 supports the transmitter 3 in a position reversed from the first embodiment, with the impulse line 35 extending through a rear wall 155 of the lower housing 151 through an entry seal 158. A breather cap 71 is installed at a lower rear part of a side wall 169 of the enclosure 101. The operation of the transmitter and enclosure are the same as in the first embodiment.

As shown in FIGS. 9-12, three draft range transmitters 3 can be installed in a single, larger, enclosure 201. The enclosure 201 may be an O'Brien A3T VIPAK® enclosure. The construction and operation of the enclosure 201 and draft range transmitter 3 are the same as those of the second embodiment.

Figure 15:
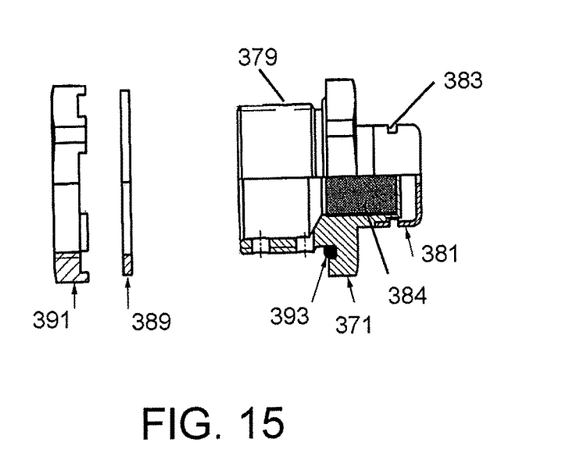
FIG. 15 is an exploded view in side elevation, partially cut away, of another breather/vent/drain cap for use with the present invention.

Different vent caps may be utilized, preferably maintaining at least ISO IP65. Some such caps may include tortuous air paths, for example. Preferably, they include semipermeable membranes. Examples are metal caps such as Hawke Model 489 breather drain (Hawke International, Ashton Under Lyne, United Kingdom) or Pepperl+Fuchs Model BDRVX-2NXS.K01 breather drain (Pepperl+Fuchs GmbH, Mannheim, Germany). Both of these illustrative breather drain caps include semipermeable membranes in the form of sintered metal plugs. One such vent cap 371 is shown in FIG. 15, in which a hollow metal cap body 373 is topped with a formed metal cap 381 having vent openings 383 which communicate with a threaded stem 379 of hollow body 373 through a sintered metal plug 384. An o-ring 393 forms a seal to the outside of the enclosure body, and a gasket 389 and nut 391 are inserted from within the enclosure body to seal the vent cap 371 to the enclosure body.

Different draft range transmitters, both mechanical and electronic, digital and analog, may be utilized.

Different enclosures may be used. Although insulated enclosures are preferred, in some situations in which temperatures remain within a narrow band and in which the transmitter is not near enough a heat source to cause inaccuracies, an uninsulated enclosure may be acceptable. Enclosures made of other thermoplastics or other materials entirely may also be used although they are not presently preferred. The enclosure may be made in a different number of pieces, and may be held together in different ways.

These variations are merely illustrative.

The invention claimed is:

1. A method of reducing false readings of a differential pressure transmitter vented to ambient, the method comprising placing the transmitter inside an enclosure which is wind resistant, the enclosure comprising a baffled vent mechanism which allows air movement through a wall of the enclosure and atmospherically equalizes air pressure in the enclosure, thereby forming a still air chamber for the transmitter.

2. The method of claim 1 wherein the vent mechanism includes a semipermeable membrane.

3. The method of claim 1 wherein the enclosure meets ISO Standard IP65.

4. The method of claim 3 wherein the enclosure meets ISO Standard IP66.

5. The method of claim 1 wherein the enclosure meets NEMA Standard 4.

6. The method of claim 5 wherein the enclosure meets NEMA Standard 4X.

7. In combination, a draft range pressure transmitter vented to ambient and an enclosure completely surrounding the draft range transmitter, the draft range pressure transmitter having a reference breather vented to atmosphere within the enclosure and an impulse line extending through the enclosure to a source external to the enclosure, the enclosure being wind resistant, the enclosure comprising a structure which equalizes pressure within the enclosure with respect to ambient barometric pressure but renders the pressure within the enclosure unaffected by wind or wind gusts.

8. The combination of claim 7 wherein the structure comprises a vent cap.

9. The combination of claim 8 wherein the vent cap includes a semipermeable membrane.

10. The combination of claim 9 wherein the vent cap includes a hollow, externally threaded stem and an internally threaded cap.

11. The combination of claim 10 wherein the vent cap has a peripheral inturned rim having a plurality of small openings interior of the rim, the openings communicating with the hollow stem.

12. The combination of claim 11 comprising a semipermeable membrane between the small openings and the stem.

13. The combination of claim 12 wherein the vent cap is mounted at or near the bottom of a side wall of the enclosure.

14. The combination of claim 7 wherein the enclosure meets ISO Standard IP65.

15. The combination of claim 7 wherein the enclosure meets ISO Standard IP66.

16. The combination of claim 7 wherein the enclosure comprises a layer of foamed polymer insulation.

17. The combination of claim 16 wherein the foamed polymer insulation is closed cell and is from about one half to two inches thick.

18. The combination of claim 16 wherein the enclosure is formed as a two-piece clamshell with latches, mating surfaces of the enclosure comprising gaskets.

19. The combination of claim 7 wherein the enclosure is made of glass reinforced plastic.

20. A differential pressure sensor having a reference breather with a port communicating with ambient atmospheric pressure, the port of the reference breather being enclosed in an enclosure, the differential pressure sensor having an impulse line extending to a source outside the enclosure, the enclosure comprising a vent cap including a semipermeable membrane, the vent cap equalizing pressure within the enclosure with respect to ambient barometric pressure but rendering the pressure within the enclosure unaffected by wind or wind gusts, the enclosure meeting ISO Standard IP65.

* * * * *